United States Patent [19]

Oshima

[11] 3,967,300

[45] June 29, 1976

[54] MINIATURE CAMERA FOR ROLL FILM

[75] Inventor: Shigeru Oshima, Tokyo, Japan

[73] Assignee: Fuji Photo Film Co., Ltd., Minami-ashigara, Japan

[22] Filed: Aug. 14, 1974

[21] Appl. No.: 497,447

[30] Foreign Application Priority Data

Aug. 17, 1973 Japan............................ 48-92150

[52] U.S. Cl............................... 354/288; 354/203
[51] Int. Cl.² ......................................... G03B 17/02
[58] Field of Search.................... 354/202, 203, 288; 352/129, 157, 159

[56] References Cited
UNITED STATES PATENTS

| 1,944,312 | 1/1934 | Black | 354/288 |
| 2,320,423 | 1/1943 | Githens | 354/288 |
| 2,554,333 | 5/1951 | Kaplowitz | 354/288 |
| 3,426,950 | 2/1969 | Maurer | 352/159 X |
| 3,756,706 | 9/1973 | Klynn | 352/129 |
| 3,820,147 | 6/1974 | Feindler | 354/288 |
| 3,848,981 | 11/1974 | Chedister | 352/157 |

Primary Examiner—Monroe H. Hayes
Attorney, Agent, or Firm—Sughrue, Rothwell, Mion, Zinn & Macpeak

[57] ABSTRACT

A miniature camera for roll film comprising means for preventing vertical displacement of loaded film but constituting no hinderance to film loading, and means for maintaining tautness in loaded film and ensuring that loaded film passes beneath said vertical displacement prevention means and is controlled thereby.

3 Claims, 3 Drawing Figures

MINIATURE CAMERA FOR ROLL FILM

BACKGROUND OF THE INVENTION

1. Field of the Invention

The present invention relates to a simplified, miniature camera, and more particularly to an improved miniature camera permitting better-controlled film feed and positioning.

2. Description of the Prior Art

There is known, and commercially available, a type of camera described as a miniature camera, which, according to the recent trade definition of the term 'miniature,' is a camera, which is small, light, and has as simple a construction as possible, and which, although usually permitting only one or two shutter settings, and having a limited technical range compared to other types of camera, offers the advantages of extreme ease of manipulation and of very low cost.

With a miniature camera, loading and unloading of film, as well as development thereof, is effected at a camera store, or similar location, and the photographer simply receives a camera complete with loaded film, and after exposing all the frames of the film takes the camera still containing the loaded film back to the camera store, where, after extraction of the film the camera containing a fresh film is returned to the photographer, in other words the photographer need only be concerned with actually taking photographs. Because it is necessary to take the camera to a store each time a complete roll of film is exposed, it is desirable, and common practice, for photographers to possess more than one miniature camera, a necessary condition for this being, of course, that the price per camera be sufficiently low.

A miniature camera is usually constituted by a flat case housing a shutter means, a lens system, chambers for accommodation of a feed spool carrying unexposed film and of a take-up spool for wind-up of exposed film, simple means, for example lever actuated sprocket means, for actuation of one or both these spools, and a passageway providing communication between the spool chambers, and permitting successive frames of a loaded film to be carried from the supply spool to the take-up spool, and into a position for exposure, in line with the optical axis of the camera lens system.

A problem associated with miniature camera construction is that while constructional elements must be kept to a minimum, to permit low purchase cost, which is one of the main advantages of the miniature camera, the camera must, of course, ensure the production of good-quality photographs in a certain range of light conditions, i.e., it must be ensured that film is held in a correct position and alignment for exposure. To keep camera construction as simple as possible, film may be simply held under tension between the feed spool and take-up spool. However, in this case there is a problem either that there is a tendency for film to ride up out of a position for exposure because the passageway between the spool chambers is not completely enclosed, or, if the passageway is enclosed at the tip, bottom, front, and rear, that loading of film becomes more difficult and adds to the cost of keeping the camera, which defeats one of the original purposes of the camera. Another problem frequently encountered when film is positioned in this manner is that insufficient tension is maintained, and some frames may be displaced slightly from a correct position for exposure, or even allowed to move laterally to a slight extend during exposure.

It is accordingly a main object of the present invention to provide a miniature camera having an improved construction.

It is a further object of the invention to provide a miniature camera requiring a minimum number of elements to ensure correct positioning of a film for exposure.

It is another object of the invention to provide a miniature camera wherein upward or downward movement of a film in an exposure position is prevented, but which permits simple, straight forward loading of film thereinto.

It is a still further object of the invention to provide a miniature camera wherein requisite tension is imparted to film to prevent unrequired lateral movement thereof.

SUMMARY OF THE INVENTION

In accomplishing these and other objects, there is provided, according to the present invention, a miniature camera having a main body portion which is covered by a detachable top cover providing lightproof protection for camera contents, and in which there is defined a film passageway having a front wall in which there is formed an opening in line with the camera lens optical axis, whereby successive frames of a film passing through the passageway may be exposed, and providing communication between two chambers, whose centres lie somewhat forward of the line of the passageway, one of which provides accommodation for a flanged feed spool carrying unexposed film, the other of which provides accommodation for a flanged take-up spool for wind-up of exposed film, and both of which, when the camera top cover is removed, are open-topped, thereby permitting easy loading or unloading of the spools into or from the camera. The feed spool is, for example, rotatably mounted on a fixed shaft, while the base of the take-up spool engages a sprocket wheel which is actuable by a photographer by means of a lever or similar means extending to the exterior of the camera, whereby film may be unwound from the feed spool, passed through the passageway, wherein it is brought to a position for exposure, and then wound up on the takeup spool. Like the film feed and take-up spool chambers, the film passageway is open at the top when the camera top cover is removed, thus permitting easy insertion thereinto of a length of film lying between the feed spool and the take-up spool, upon initial loading of film into the camera. Since the centres of the spool chambers, which are also the rotatory centres of the reed and take-up spools, are forward of the passageway, after a film is loaded into the camera, and the slack thereof has been taken-up, film portions leading into the passageway entrance end, i.e., the passageway end communicating with the feed spool chamber, or out of the passageway exit end, i.e., the passageway end communicating with the take-up spool chamber, are inclined forwards, away from the line of the passageway. Over the passageway entrance and exit ends there are provided eave portions, whose rear edges do not contact a camera rear wall or other camera portion, the portions thus constituting no hindrance to initial loading of a film, and which lie over the forwardly inclined parts of a loaded film, and so prevent the film from moving upwards out of a correct alignment for exposure when being wound up from the feed spool by the take-up spool.

Also according to the invention there is provided a removable semi-circular element which fits around film on the feed spool, and comprises a projection extending to below the eave portion over the passageway entrance, and contacts and presses film being fed into the passageway, whereby requisite tension to prevent any unrequired lateral movement of the film is maintained, and the film is always guided to underneath the eave portion over the passageway entrance.

BRIEF DESCRIPTION OF THE DRAWINGS

A better understanding of the present invention may be had from the following full description of one preferred embodiment thereof, when read with reference to the attached drawings, in which like numbers refer to like parts.

DESCRIPTION OF THE PREFERRED EMBODIMENT

Figure 1:
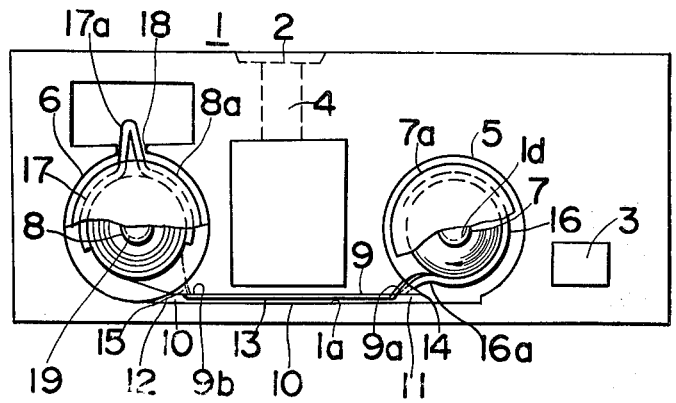
FIG. 1 is plan view showing the main parts of a camera according to the invention.

Referring to FIG. 1, there is shown the main body 1 of a miniature roll film camera. The camera also comprises a top cover, which, for the purposes of clarity, is not shown in the drawings, which is detachable to permit loading or unloading of film, and which, when attached, provides complete lightproof cover for the camera interior. The camera main body 1 has mounted therein a lens, or lens system, 2, along whose optical path 4 light may be directed to expose a frame of a film 13, upon actuation of a conventional shutter means, not shown, by depression of a shutter button 3. Film 13 to be exposed is initially provided on a feed spool 7, which has a large end-flange or flanges, 7a, and is rotatably mountable on a fixed shaft 1d, or other suitable means, provided in a chamber 5, which is formed in a right-hand, rear portion of the camera main body 1. In a left-hand, rear portion of the main body 1 there is formed a matching chamber 6, which provides accommodation for a take-up spool 8 having a large top-end flange 8a. The bottom end of the take-up spool 8 is recessed, and fits onto a sprocket 19, which is provided in the base of the chamber 6, and is rotatable upon actuation of a lever, not shown, by a photographer in a known manner. A passageway 10, which communicates at one end with the rear side of the feed spool chamber 5, and at the other end with the rear side of the take-up spool chamber 6, is provided in a rearmost portion of the camera main body 1.

Figure 2:
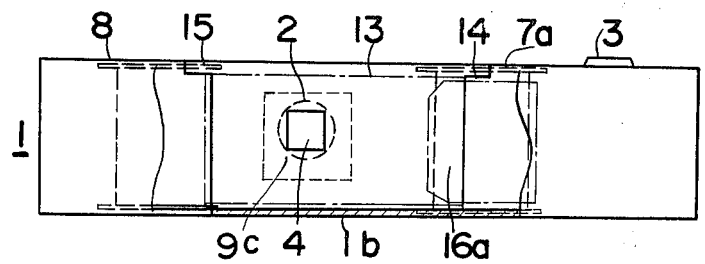
FIG. 2 is a side view, partially in section taken along broken lines, of the camera of FIG. 1.

The passageway 10 is defined by the rear wall 1a and bottom wall 1b of the main body 1, and an inner wall 9, the main portion of which is parallel to and slightly separated from the camera rear wall 1a. When loaded in a manner described below, film 13 extends from the feed spool 7, through the passageway 10, and to the take-up spool 8. Since the passageway 10 communicates with the rear sides of the spool chambers 5 and 6, the rotatory centres of the feed and take-up spools 7 and 8 lies forward of the line of the passageway 10, and loaded film 13, although guided in a straight line while in the passageway 10, does not enter or leave the passageway 10 in a straight line, but that portion of the film 13 which comes from the feed spool 7 and passes through a passageway entrance area 11 into the passageway 10 inclines rearwardly, and that portion of the film 13 which leaves the passageway 10 and passes through a passageway exit area 12 to the take-up spool 8 inclines forwardly. To ensure smooth entry and exit of the film 13 into and from the passageway 10, opposite ends of the inner wall 9 form forwardly curved portions 9a and 9b, extending into the passageway entrance area 11 and passageway exit area 12, respectively. As indicated in FIG. 2, in a generally central portion of the inner wall 9 there is formed an opening 9c, which is in line with the optical path 4 of the lens 2, and through which successive frames of the film 13 passing through the passageway 10 may be exposed.

Figure 3:
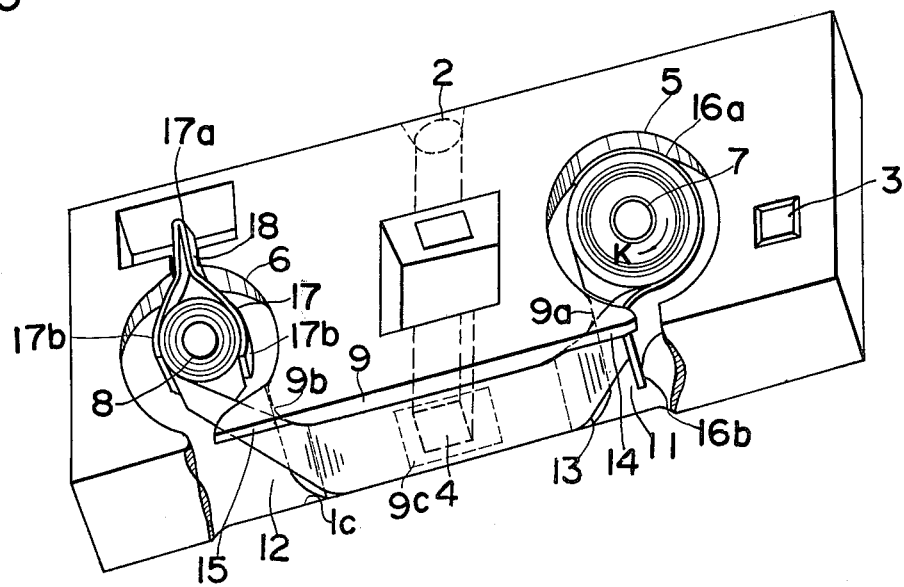
FIG. 3 is a perspective view, partially in section, of the camera of FIG. 1.

In FIGS. 1 and 3, the upper surface wall 1c of the camera main body 1 forms eave portions 14 and 15, which extend over the passageway entrance area 11 and exit area 12, respectively.

The rear edges of the eave portions 14 and 15 form straight edges which are parallel to the camera rear wall 1a, and constitute simple right and left continuations of the line of the inner wall 9. Thus, seen from above, the front of the passageway 10 is defined by the inner wall 9 and the rear edges of the eave portions 14 and 15, and the passageway 10 is simply a straight passage leading into the spool chambers 5 and 6.

As shown most clearly in FIG. 3, wherein, for clarity, the flanges 7a and 8a of the feed spool 7 and take-up spool 8 are omitted, there is provided a generally sickle-shaped press clip or member 16, which is associated with film 13 on the feed spool 7. The press clip 16 is made of a strong, flexible material, and prior to being mounted in the camera the main portion 16a thereof closes, or almost closes, to form a circle, to which appends an integral extension 16b. To mount the press clip 16, the main portion 16a thereof is opened and then fitted around the right-hand side of the film 13 on the feed spool 7, the extension 16b extending rearwards. Because of its natural tensile properties, the clip 16 always closes on the film 13 and remains in contact therewith, even when the film 13 is gradually unwound, and the amount thereof remaining on the feed spool 7 becomes less and less. Because of this pressure contact between the press clip 16 and film 13 on the spool 7, when the spool 7 is rotated in the direction K in the drawing, to unwind film 13, friction causes the clip 16 also to be moved as far as possible in the direction K, whereby the extension 16b thereof is pushed against the stretch of film 13 between the feed spool 7 and the passageway 10, and this stretch of film 13 is pressed forwards, well into the passageway entrance area 11, and caused to pass under the eave portion 14 by the clip extension 16b.

Still in FIGS. 1 and 3, the take-up spool 8 and film 13 wound up thereon are held in position by a clasp element 17, which is constituted by a long rectangular plate made of a strong tensile material and formed into the general shape of a caliper having a base portion 17a and a pair of arms 17b. The clasp element 17 itself is held in position by the base portion 17a thereof being fitted into a slot portion 18, which is formed in the camera main body 1 on the forward side of, and communicating with the take-up spool chamber 6. In this configuration, the clasp element arms 17b extend rearwards to either side of the take-up spool 8, and close as far as is permitted by the body of the spool 8, or by the body of the spool 8 and film 13 wound up thereof.

In using the above described camera, the top cover, not shown, thereof is removed, a feed spool 7 carrying unexposed film 13 is obtained, a suitable length of film 13 is unwound from the feed spool 7, the loose end of this film 13 is attached to an empty take-up spool 8, the spools 7 and 8 are dropped into their respective chambers 5 and 6, and the stretch of film 13 therebetween is simply slotted into the passageway 10 and to the rear of the eave portions 14 and 15. As noted earlier, the rear edges of the eave portions 14 and 15 constitute in effect opposite end extensions of the inner wall 9, and so this loading of the film 13 is accomplished as easily as loading of film into a completely open-topped passageway 10 extending between similarly open-topped spool chambers 5 and 6. Next, the take-up spool 8 is rotated sufficiently to take-up the slack of the film 13, and to bring a first frame thereof into line with, or into a position ready for immediate movement into line with, the lens optical axis 4, the film 13 thereupon being tautened between the spools 7 and 8 and brought into the general configuration shown in FIG. 3, i.e., film 13 passes from the feed spool 7, around the inner wall curved portion 9a, through the passageway 10, around the inner wall curved portion 9b, under the eave portion 15, and to the take-up spool 8. After this, the camera cover is replaced, the camera now being ready for use by a photographer. As successive photographs are taken, and the take-up spool 8 is rotated to wind up the exposed film 13, the clasp element 17 gradually expands as the amount of film 13 on the take-up spool 8 increases, and thus, while holding the take-up spool in position, ensures that the film 13 remains tightly wound on the take-up spool 8. At the same time, the feed spool 7 is rotated in the direction K, whereby the press clip 16, which contracts as the amount of film 13 on the feed spool 7 decreases, and so always remains in contact with the outermost layer of film 13 on the feed spool 7, is constantly turned into an alignment wherein the extension 16b thereof presses film 13 to below the eave portion 14, thus constantly ensuring both that the film 13 is suitably taut and contains no play liable to result in a frame thereof being shifted laterally out of a correct position for exposure, and that the film 13 always passes under an eave portion preventing upward movement of the film 13 out of a correct alignment for exposure.

The present invention thus provides a roll-film miniature camera in which purchase and handling costs are minimum, since constructional costs are minimum, and since from the point of view of film loading the camera has a completely open-topped structure, but in which film may be advanced accurately without risk of jamming or lateral or vertical displacement out of alignment for exposure.

Needless to say, if so required, only one eave portion need be provided, for example, at the feed spool chamber end of the film passageway, or the same results may be achieved by providing the press clip 16 as a clip which fits onto the feed spool flange 7a, rather than onto film 13 on the feed spool 7. These and other modifications to the abovedescribed camera will be obvious to those skilled in the art, and the scope of the invention should therefore be determined from the following claims.

What is claimed is:

1. In a miniature camera for a roll film and including a lens and a body having therein a chamber for accommodation of a feed spool carrying unexposed film, a chamber for accommodation of a take-up spool for wind-up of exposed film, and a passageway which provided communication between said chambers, said passageway being defined by an inner wall, a rear wall and a bottom floor of said camera body, said inner wall having formed therein an opening permitting exposure of successive film frames to light directed to the lens of said camera, whereby, successive rolls of film on successive feed and take-up spools are loaded into or unloaded from said camera and successive frames of a loaded film are carried from a feed spool to a position for exposure and thence onto said take-up spool, upon rotation of said spools, the improvement comprising: a first body eave portion projecting over an open chamber portion adjacent to the entrance of said passageway and intermediate said passageway entrance and the mounting axis of a feed spool within the feed spool chamber, to prevent vertical displacement of a film passing through said passageway, and a press member made of a material having elastic properties, said press member comprising an arcuate main portion expandable to form an approximate semi-circle and fitting on the film carried on the feed spool, and a radial extension portion contacting the film passing from said feed spool to said passageway entrance, said press member being moved due to frictional contact with said film upon rotation of said feed spool to press said extension portion against said film and cause said film to pass beneath said first eave portion.

2. A miniature camera for roll film as recited in claim 1, further comprising a second eave portion extending over an open portion of said take-up spool chamber intermediate of said passageway exit and the mounting axis of a take-up spool within said take-up spool chamber.

3. A miniature camera for roll film as recited in claim 1, wherein said spool includes a flange and said press member is in frictional contact with said flange for movement therewith.

* * * * *